Patented Feb. 1, 1949

2,460,457

UNITED STATES PATENT OFFICE 2,460,457

ORGANO-SUBSTITUTED SILOXANE POLYMERS

James Franklin Hyde, Corning, N. Y., assignor to Corning Glass Works, Corning, N. Y., a corporation of New York No Drawing. Application April 17, 1943, Serial No. 483,448

7 Claims. (Cl. 260—46.5)

This invention relates to organo-silicon oxide polymers and methods of preparing them and, more particularly, to the copolymerization of the products obtained by the hydrolysis of different hydrolyzable silicanes.

This application is a continuation-in-part of my copending application Serial No. 432,528 filed February 26, 1942.

The hydrolysis of a silicane of the type $SiX_4$, where X is any hydrolyzable atom or group, such as halogen, alkoxy, hydrogen, amino, etc., does not result in a simple hydroxy compound but produces instead a brittle, insoluble, infusible gel comprising a three-dimensional network of structural units composed of siloxane linkages as a result of the concurrent or subsequent loss of water from the intermediately formed hydroxy compound Type I

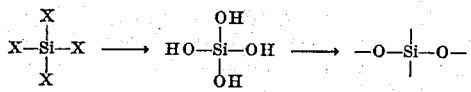

The formation of a siloxane linkage requires the close approach of two hydroxyl groups. It is apparent that, in the formation of such a rigid structure, many hydroxyl groups become isolated and block some of the possible cross linkages. As the structural network becomes more complicated, dehydration becomes increasingly more difficult, and the result is a partially dehydrated silica gel of poor dimensional stability.

Organo-substituted silicanes of the type $RR'SiX_2$ can be prepared by means of the Grignard reaction, where R and R' may be the same or different organic radicals which are capable of being joined directly to silicon through a carbon atom. Such silicanes also may be hydrolyzed and dehydrated, the dehydration probably proceeding to some extent concurrently with the hydrolysis, particularly if the temperature is allowed to rise.

Type II

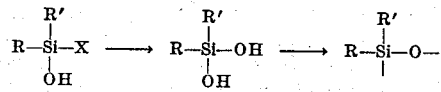

In each structural unit two of the four silicon bonds are now blocked by the organic radicals R and R', and only two siloxane linkages are possible. Hence a three-dimensional network is no longer possible and the resulting liquid or solid polymers can comprise only chain and cyclic structures. Intermediate crystalline di-hydroxy compounds can in some instances be isolated. The final products which are usually resinous in character bear little physical resemblance to silica gel but are closely related thereto in chemical structure, differing only in the restriction of possible siloxane linkages.

Prior attempts to utilize the above described reactions have not contemplated combinations thereof, but have been confined more or less to the individual reactions and their products. Such products, as shown above, have limited utility and the range of properties obtainable in the products of a given type of reaction is relatively restricted. For example, the product resulting from type I reaction is an insoluble, infusible gel of little utility.

The primary object of my invention is to provide a method of copolymerizing the hydrolysis product of a compound having the general formula $SiX_4$ with the hydrolysis product of a compound having the general formula $RR'SiX_2$ where each X is any hydrolyzable atom or group and R and R' are the same or different organic radicals directly attached to silicon through carbon atoms.

Another object of my invention is to cohydrolyze and inter-condense a mixture of organo-silicon compounds containing a compound having the general formula $SiX_4$ and a compound having the general formula $RR'SiX_2$.

Still another object of my invention is to prepare organo-silicon oxide copolymers having in part the formula

and in part the formula

Another object of the present invention is to prepare liquid organo-silicon oxide copolymers of high viscosity.

Still another object of my invention is to prepare organo-silicon oxide copolymers which are heat convertible and soluble in organic solvents.

A still further object of this invention is to prepare organo-silicon oxide copolymers which are infusible and insoluble resins.

My new method comprises mixing a compound of the type $RR'SiX_2$ with a compound of the type $SiX_4$, where R and R' are the same or different organic radicals directly attached to silicon through carbon atoms and X is any hydrolyzable atom or group, and causing them to hydrolyze together and to become inter-condensed. This is best accomplished by introducing into the mixture by dropwise addition thereto the amount of water which is calculated for complete hydrolysis of the mixture and which preferably is dissolved in from two or four volumes of a common solvent such as alcohol, dioxan, acetic acid, acetone, etc. Although a difference in the reactivity of the various individual types of hydrolyzable compounds and a variation in the amounts present in the initial mixture may make it desirable to vary the conditions of the process, as will appear from a consideration of the accompanying examples, the above recited procedure in general is to be preferred. The use of a water miscible solvent for diluting the hydrolyzable mixture or the water or both and the dropwise addition of the water insures the maintenance of homogeneity during hydrolysis. Under these conditions condensation or the formation of siloxane linkages occurs concurrently with the hydrolysis, but it is to be understood that the extent of further subsequent dehydration is optional and will depend largely upon the use to which the product will be put. Also in order to better control the properties of the resulting product it is desirable to have the starting materials substantially pure, or at least free of other hydrolyzable compounds which tend to produce unwanted copolymeric combinations.

In any hydrolyzable mixture of silicanes, one or more of which is organo-substituted through C—Si linkage and contains hydrolyzable atoms or groups attached to the silicon atom, cohydrolysis and dehydration by this method will result in copolymerization or formation of interconnecting oxygen linkages between the silicon atoms of the various silicanes. The variety of the substituted organic radicals is limited only by their ability to form a Grignard reagent. In other words, the organo silicanes which may be employed in my process include all such compounds which contain one or more hydrolyzable atoms or groups and which may be prepared by means of the well-known Grignard reaction. The radicals which may thus be substituted may include alkyl radicals such as methyl, ethyl, propyl, isopropyl, butyl, isobutyl, amyl, hexyl, heptyl to octadecyl and higher; alicyclic radicals such as phenyl, mono- and poly-alkyl phenyls as tolyl, xylyl, mesityl, mono, di- and tri-ethyl phenyls, mono-, di- and tri-propyl phenyls, etc.; naphthyl, mono- and poly-alkyl naphthyls, as methyl naphthyl, diethyl naphthyl, tripropyl naphthyl, etc.; tetrahydronaphthyl; anthracyl, etc.; aralkyl such as benzyl, phenylethyl, etc.; alkenyl such as methallyl, allyl, etc.

If the hydrolyzable group or groups of all of the compounds in the mixture to be hydrolyzed are halogens, it is preferable to employ dioxan as the solvent because it is inert to the halogens. If the mixture contains both halogen and alkoxy groups, the former can be converted to the latter by the slow addition of dry alcohol to the mixture, or the mixture can be diluted with dioxan and treated with aqueous alcohol. When the mixture contains only alkoxy groups, any water miscible solvent may be used together with a trace of acid, such as HCl, as catalyst. In this case, alcohol may be preferred on account of its relatively low cost. Mixtures of water miscible solvents may be used.

In the above described method, the slow incorporation of water into the homogeneous solution ensures that hydrolysis is not permitted to proceed unchecked, whereby the more reactive silicane or silicanes, that is, silicanes containing few or no substituted organic radicals per silicon atom, would be more completely hydrolyzed and condensed before the less reactive or more highly substituted silicanes have had an opportunity to react. On the contrary, the less reactive silicanes are thus given a greater opportunity to hydrolyze simultaneously with the more reactive silicanes than would be the case if the hydrolysis were conducted rapidly. Under these circumstances, simultaneous condensation of the various intermediate hydroxy compounds takes place and an intimate intermolecular combination through siloxane linkages of silicon atoms bearing different numbers and kinds of organic radicals becomes possible to the fullest extent. This ensures a true copolymerization with the formation of homogeneous products containing mixed unit structures.

After removal of solvent and excess water the hydrolysis products resulting from the above process are water-immiscible liquids of varying viscosity. They are soluble in the common organic solvents such as benzene, toluene, etc. Many of them are thermoplastic, some are thermosetting, and some are thermally stable liquids. Further condensation and polymerization may be brought about by heating, which generally results in an increase in viscosity and in some cases, if carried to completion, results in resinous solid products. The desired degree of polymerization will depend largely upon the contemplated use of the product and may be varied at will, since the final physical properties depend directly on the total number of siloxane linkages per molecule and the disposition of the siloxane linkages, this being controlled by the relative amounts of the various types of silicanes initially present.

The class of copolymers which can be produced by my method may be represented as combinations of the structural units

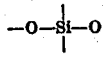

and

bearing in mind that the structural units are chemically combined with each other by siloxane linkages, that the percentage of each type of unit may be varied at will and that the properties of the resulting products will show corresponding variations which can be predicted in making compositions for a particular purpose.

The partially dehydrated copolymers or hydrolysis products, after removal of solvents, are generally liquids of various viscosities and they vary in the extent to which dehydration has occurred at this stage. The ease of dehydration and the physical properties of the completely condensed copolymers vary with the kind of substituted organic radicals and with their number or with the final ratio of oxygen to silicon. Subsequent heating is usually necessary for complete dehydration, particularly when the oxygen to silicon ratio is greater than one. The extent of heating necessary depends upon the ease of dehydration which in turn depends upon the molecular size of the organic radical or radicals present and the number of possible siloxane linkages, that is, the final oxygen to silicon ratio. Products containing methyl radicals dehydrate more readily than those containing ethyl, propyl, etc., radicals or phenyl radicals and in general products containing alkyl radicals dehydrate more readily than those containing aryl radicals. Ease of dehydration also increases as the number of radicals per silicon atom increases or as the final oxygen to silicon ratio decreases. When this ratio is less than one, the copolymers are oils of relatively low viscosity. Their volatility decreases with increasing molecular size of the radicals and at the same time the viscosity may increase somewhat. As the final oxygen to silicon ratio increases from 1.0 to 1.3, there is a corresponding increase in molecular complexity or the number of siloxane linkages and an accompanying increase in viscosity. When the ratio is in the neighborhood of 1.3 and aryl radicals predominate, the viscosity increases to such an extent that the copolymer is a thermoplastic solid which may be fused and solidified repeatedly by heating and cooling. As the oxygen to silicon ratio is increased to the neighborhood of 1.5 and beyond (approaching 2), the copolymers tend to become thermosetting and more particularly if the molecular size of the radicals is decreased.

Thus it will be seen that uniformity of behavior not only makes possible a wide variation in properties of the compositions, including viscosity, vapor pressure, melting range, setting rate, hardness, toughness, etc., but it also enables one to predict the most suitable combination of intermediate compounds for the production of a copolymer for the desired purpose.

The following examples will illustrate the mode of operation of the process and the character of the resulting products. In the examples abbreviations are used to designate certain radicals and groups thus: methyl (Me); ethyl (Et); ethoxy (OEt); phenyl ($\phi$).

*Example 1*

A mixture of 39.8 grams of phenylmethyldiethoxysilicane and 49.3 grams of ethyl orthosilicate in the molar ratio of 1 to 1.25 was heated to approximately 70° C. A mixture of one gram of 1% hydrochloric acid and one gram of 95% ethyl alcohol was then added dropwise over a period of thirty minutes to the vigorously stirred mixture of esters. Another 15 grams of aqueous 1% hydrochloric acid was then added dropwise over a period of three hours. After the addition was complete the resulting solution was stirred for another hour. Toluene amounting to one-half the volume of the reaction mixture was then added to aid in the removal of the alcohol. The larger part of the solvent was removed by bubbling air through the sample at room temperature for about four hours. The sample was then heated at about 70° C. under reduced pressure for two hours. The copolymer at 70° C. was a very viscous but homogeneous liquid. When a sample of the viscous product was applied to a glass plate and heated, a resin was formed which was soft and slightly tacky at room temperature. Tackiness disappeared on baking thin films of the resin on glass for two hours at 100° C.; after such baking, the resin was still soft. A sample of the viscous product set to a soft resin showing inappreciable flow at 250° C. when heated for ¾ of an hour in a small tube at that temperature. After another two hours at 250° C., the resin was hard.

*Example 2*

A sample of copolymer from $SiCl_4$ and $\phi MeSi(OEt)_2$ in the molar ratio of 1/2.5 was prepared by slowly adding dropwise to the stirred mixture approximately the required amount (for anhydrous product) of water diluted with an equal volume of alcohol. The reaction proceeded smoothly with no sign of silicic acid formed. The viscous product was then air blown 14 hours at 250°–260° C. This copolymer sample was applied to a piece of glass tape and also to a glass plate where it remained liquid upon heating four hours in an oven at 250° C. The resin set to a tack-free condition after being kept in the oven overnight (total 18 hours) and was then quite tough and flexible.

*Example 3*

A sample of a copolymer was prepared from $SiCl_4$ and $\phi MeSi(OEt)_2$ in the ratio 1/3 by adding aqueous alcohol to the mixture dropwise. The product was a clear viscous liquid showing no signs of silicic acid after solvent removal. Air was blown through the product for 20 hours at 250° C.–270° C. The liquid was thereby brought to an extremely viscous state, but was still soluble in organic solvents. A sample of the liquid dissolved in benzene was applied to glass insulating tape. Heating to 250° C. converted the resin to an excellent non-tacky and flexible coating.

*Example 4*

A mixture of 6.3 grams of $\phi MeSi(OEt)_2$ and 2.1 grams of $Si(OEt)_4$ in the molar ratio of 3 to 1 was diluted with an equal volume of dioxan. To this mixture was added slowly and with shaking 1.8 grams of $H_2O$ in 6 cc. of dioxan. A trace of concentrated HCl was added to the water to hasten hydrolysis. The solvent and water were removed at room temperature and a fluid liquid remained. This was then air blown at 250° C. until it became viscous. This took six hours at 250° C. The copolymer was dissolved in benzene. After being applied to glass tape and heated at 250° C., it set to a flexible, non-brittle coating in three hours which still retained these characteristics after 120 hours at 250° C. When applied to a glass plate and heated at 250° C., the toluene solution deposited a film which set to a flexible, non-brittle solid in twenty hours and remained substantially unchanged when held at 250° C. for a total of 66 hours. In an aluminum cup at 250° C. the resin set in five to six hours and was unchanged after 49 hours at 250° C.

*Example 5*

A mixture of $Si(OEt)_4$ and $\phi MeSi(OEt)_2$ in the molar ratio of one to four was treated as in Example 3. The product was bodied by air blowing 4½ hours at 250° C. A sample dissolved in benzene and applied to tape was heated at 250° C. It set in eight hours and after 27 hours at 250° C. the sample was still flexible and non-brittle.

*Example 6*

A mixture of $Si(OEt)_4$ and $\phi MeSi(OEt)_2$ in the molar ratio of one to five was treated as in Example 3. The product was bodied by air blowing 3½ hours at 250° C. A sample dissolved in benzene and applied to tape was heated at 250° C. It set in somewhat over eight hours. After 27 hours at 250° C. the sample was still flexible and non-brittle.

Example 7

Approximately .28 mole of ethyl silicate was mixed with approximately .25 mole of $Et_2SiCl_2$. Aqueous alcohol was added to bring about hydrolysis under homogeneous conditions. A viscous oily liquid resulted on evaporation of the solvent. On further heating gelation occurred quite rapidly leaving a rubbery resin which became somewhat brittle on further heating.

Example 8

Approximately .045 mole of ethyl silicate was mixed with approximately .15 mole of $Et_2SiCl_2$ and treated with aqueous alcohol. On evaporation an oily liquid remained, which set up slowly on extended heating on a glass plate to leave a non-brittle coating.

Example 9

A mixture of 5.1 parts by weight of $SiCl_4$ and 6.28 parts by weight of $Et_2SiCl_2$ was converted to esters by dropping in dry alcohol. Hydrolysis was accomplished by dropwise addition of 3 parts by weight of $H_2O$ diluted with four or five volumes of ethyl alcohol. Two liquid phases separated. The aqueous layer was removed. An extremely viscous tacky liquid resulted. This was dissolved in toluene for use in impregnation. A sample applied to glass fibre tape showed infinite electrical resistance. A sample heated on a glass plate at 180°–190° C. for a half-hour was still a clear viscous liquid. After finally setting up on glass fibre tape by additional heating, the resin was hard and tough, but not brittle.

Example 10

A mixture of 0.70 gram of $Si(OEt)_4$ and 1.57 grams of $Et_2SiCl_2$ in the molar ratio of 1 to 3 was hydrolyzed and condensed. A viscous oil was produced. This material was air-blown for 30 minutes; dissolved in benzene and placed on glass tape. The tape sample was heated at 170° C. After 30 minutes the resin had set to a flexible film. Heating was continued at 250° C. After fifteen hours at 250° C. the sample was a hard resin.

Example 11

A mixture of 125 grams of $Et_2SiCl_2$ and 86 grams of $Si(OEt)_4$ was warmed to approximately 70° C., and 26 cc. of $H_2O$ added dropwise over a period of three to four hours with vigorous stirring. A small amount of silicic acid precipitated at the start. Stirring was continued for two to three hours. The heating was continued for ten to fifteen minutes to help remove part of the remaining HCl. The sample stood in this condition for four days without noticeable change. Approximately 30 cc. of toluene had been added to discourage gelation of the viscous liquid. This solution then was placed under a water suction vacuum for approximately two hours to help remove remaining acid and alcohol. The viscous syrup which still showed traces of acid was again diluted with 30 cc. of toluene and was vacuum treated. It was still slightly acid to test paper, so it was again diluted with 30 cc. of toluene and allowed to stand.

On evaporation at room temperature, the material became a solid which could be redissolved. On an aluminum strip the material dried tack-free at room temperature. In the oven at 250° C. it first softened, then became tough and rubbery, and was hard in about five minutes at this temperature.

Example 12

Equimolecular proportions of $\phi_2SiCl_2$ and $SiCl_4$ were mixed. To this mixture dry methyl alcohol was added slowly and HCl was evolved. Aqueous alcohol was added to cause hydrolysis. Some toluene was then added to dissolve the resulting resin and excess water and toluene was removed by boiling. The resulting liquid product was applied to a glass plate and after two or three hours of heating at 180°–190° C. the resin was still plastic while hot, but had lost its tackiness and showed a tendency to thermoset. On cooling it cracked from the glass, due to its difference in expansion from that of the glass.

Example 13

0.54 gram of $\phi_2Si(OH)_2$ was mixed with 0.45 gram of $SiCl_4$ by dissolving in benzene. After boiling for a few minutes and allowing to stand overnight, crystals of the diol no longer separated out. A sample on a glass square at approximately 180°–190° C. for two hours became a hard, rather brittle resin, as in Example 12, after cooling to room temperature.

Example 14

A mixture of $SiCl_4$ and $\phi_2SiCl_2$ in the approximate molar ratio of 1/1.8 was diluted with dioxan. Moist air was then passed through the solution. After 18 hours hydrolysis appeared to be complete. A very viscous sticky mass remained, which set quite rapidly with heating to a resin which was rather rubbery while hot but hard and slightly brittle when cold. Further heating further advanced the set.

Example 15

Three molecular parts of $\phi_2SiCl_2$ were mixed with one molecular part of $SiCl_4$. Dry methyl alcohol was then added to form the esters. It was diluted with acetone and aqueous acetone was then added dropwise. A viscous sticky mass remained on evaporation. It appeared perfectly homogeneous, and lost its tackiness, forming a hard thermoplastic resin on heating 24 hours.

Example 16

A mixture of .69 gram of $Si(OEt)_4$ and 2.53 grams of $\phi_2SiCl_2$ in the molar ratio of one to three was hydrolyzed and condensed. The copolymer was air blown at 240° C. for thirty minutes; dissolved in benzene and placed on glass tape. Heating for thirty minutes at 180° C. produced a solid resin.

Example 17

A mixture of 2.08 grams of $Si(OEt)_4$ and 3.79 grams of $\phi_2SiCl_2$ in the molar ratio of two to three was hydrolyzed and condensed. A viscous oil was produced. This was air blown and in thirty minutes at 180° C. it had set to a resinous solid.

Example 18

A sample of copolymer formed on the hydrolysis of $Si(OEt)_4$ and $\phi_2SiCl_2$ in equimolecular proportions was prepared. The product was a solid which retained its shape at room temperature but which could be readily molded by hand. It could be drawn into short fibres which retained their shape. The material became liquid on heating to about 80° C., on continued heating at higher temperatures the softening point was raised. On heating three hours in a tube at 250° C., the sample was solid at that temperature.

Example 19

The copolymerization of Si(OEt)$_4$ and $\phi_2$SiCl$_2$ was carried out in dioxan, using the molar ratio of 2/3. After removal of solvent the material was a viscous sticky liquid. After heating at 190°–200° C. for a half hour, it showed signs of setting and was a non-tacky, non-brittle resin at room temperature. On heating it around 200° C. for 72 hours, further setting occurred and the resin became hard and somewhat brittle.

Example 20

A mixture of SiCl$_4$ and $\phi$EtSiCl$_2$ in the molar ratio 1/4 was hydrolized by adding glacial acetic acid. The oily product became resinous after extensive heating on the hot plate at 180° to 190° C.

Example 21

Copolymerization of Si(OEt)$_4$ and $\phi$EtSiCl$_2$ was carried out in dioxan. The ratio was 2/3. A tacky soft resin remained, which set quite rapidly with heating. After an hour at 190° to 200° C., it formed a tough resilient transparent film.

Example 22

A mixture of 6 grams of $\phi$EtSiCl$_2$ and 2 grams of Si(OEt)$_4$ in the molar ratio of 3 to 1 was diluted with three times its volume of dioxan. The intermediates were copolymerized by the slow addition of 1.8 gram of H$_2$O in dioxan. The solvent was removed in vacuo and air was blown through the residual oil at 250° C. for three hours. It was then heated in an aluminum dish at 260° C. It set in less than 2½ hours and after 4½ hours it was hard.

Example 23

A copolymer was made by mixing 8.2 grams (.04 m.) of $\phi$EtSiCl$_2$ and 2.1 grams (.01 m.) of Si(OEt)$_4$ and hydrolyzing with the theoretical amount of H$_2$O. After removal of solvent and water, air was blown through the product for four hours at 250° C. This produced a viscous product. The air-blown product was dissolved in benzene and placed on glass tape. It set at 180° to 190° C. After three hours at this temperature the resin was still tacky. The sample was then heated at 250° C. After one hour it produced a non-tacky flexible film which was still good after twenty hours additional heating at 250° C.

Example 24

A copolymer sample from Si(OEt)$_4$ and $\phi$EtSiCl$_2$ in the molar ratio of one to three was prepared by slowly adding dropwise to the stirred mixture approximately the required amount (for anhydrous product) of water diluted with an equal volume of alcohol. The product was a liquid which was brought to a highly viscous stage by air blowing 18 hours at 200°–250° C. This was cured on glass tape and plate in the 250° C. oven. The resin was found to set in less than four hours.

Example 25

Equimolecular proportions of Si(OEt)$_4$ and Me$_2$Si(OEt)$_2$ were mixed and copolymerized by adding dropwise the calculated amount of water containing a trace of HCl and vigorously shaking the mixture. Evaporation gave a very viscous liquid, which gelled rapidly with further heating giving a weak rubbery resin which crumbled rapidly. A sample on a glass plate with moderate warming began to craze and flake off. When the initial hydrolysis mixture was rapidly treated with an excess of water, copolymerization did not occur but a gel similar to silica gel was precipitated.

Example 26

A copolymer was prepared from Si(OEt)$_4$ and Me$_2$Si(OEt)$_2$ in the molecular proportions of 1/3 by dropping in somewhat more than the calculated amount of water containing a trace of HCl. After evaporation, a transparent viscous oil remained which set very slowly and became a rubbery rather weak gel only after thirty-six hours of heating at 190° C.

Example 27

.1 mole of Si(OEt)$_4$ and .2 mole of Me$_2$Si(OEt)$_2$ were mixed and to the mixture was added dropwise the calculated amount of water (containing a drop of concentrated HCl) for complete hydrolysis. A viscous clear solution remained. After evaporation of the solvent a clear extremely tacky mass was left. A sample heated on a glass plate at 190° C. was still fluid after two to three hours. On heating for twenty hours, it finally gelled to a slightly rubbery film.

Example 28

A mixture of 4.4 grams of Me$_2$Si(OEt) and 2.1 grams of Si(OEt)$_4$ in the molar ratio of three to one was diluted with an equal volume of dioxan and copolymerized by the slow addition of a 50% aqueous dioxan solution containing one drop of concentrated HCl. After hydrolysis was complete the solvents and water were removed at reduced pressure. This resulted in a tough gel which was almost entirely soluble in dioxan-ether solution. The copolymer was dissolved in dioxan and placed on glass tape. The sample was heated at 250° C. Heating for thirty minutes gave a soft resin. When heated in an aluminum dish at 180° C. for twelve hours the product set to a resin which was tough.

As has been pointed out it is possible to predict the general properties of the copolymers on the basis of the oxygen/silicon ratio and the secondary effect of the size of the organic radicals. However, in all organo silicanes the thermal stability of the carbon-silicon linkage varies with the kind of radical. It is necessary to take this into account when considering uses for copolymers. In general, there is a decrease in thermal stability with increase in size of aliphatic radicals. The compositions containing allyl, methallyl, benzyl and $\beta$-phenyl-ethyl radicals are relatively less stable than compositions containing such radicals as phenyl, methyl, ethyl, etc. Therefore certain temperature limitations are encountered in their uses.

It will be seen that the copolymers produced by my method are not mixtures of individual polymers, but are new compounds differing therefrom in homogeneity of structure and properties. It will further be seen that the new polymers may contain various different radicals attached to the same silicon atom and the individual silicon atoms may differ in the number and kind of radicals attached thereto in which respect the new polymers differ from previous organo-silicon polymers where each silicon atom was attached to the same kind of radicals. Such differences result in new compounds or copolymers which embody various improvements over previous polymers with respect to temperature coefficient of change of viscosity, thermal resistivity, chemical stability, electrical properties, etc.

The copolymers produced by my method may be adapted to various uses and for any specific use the physical properties and characteristics of the product can be controlled by the proper selection of the initial starting materials so as to obtain the desired oxygen to silicon ratio and a suitable variety of radicals attached to the silicon atom. Products which remain liquid with little or no tendency for further polymerization even at elevated temperatures include products having an oxygen to silicon ratio between 0.5 and 1.0 and particularly those containing lower alkyl radicals. Such products have good electrical properties whereby they may be used as the liquid filling medium for transformers, circuit breakers, submarine cables, condensers, etc. In general, these products have an unusually low coefficient of change of viscosity with temperature and may find use in hydraulic pressure systems which are subjected to wide changes of temperatures or as lubricants for systems of moving parts operating under subnormal or abnormal temperatures.

More viscous liquid products, such as those wherein the oxygen to silicon ratio lies in the neighborhood of 1.0 or more, may also be used for lubricants and are particularly useful as damping media in delicate instruments and the like.

Thermoplastic and thermosetting products having an oxygen-silicon ratio usually greater than 1.0 are useful as molding compounds, film forming coatings, varnishes, impregnating agents for electrical insulation and the like. They may be applied as solutions of the incompletely condensed copolymers and after evaporation of the solvent can be further polymerized in situ. The more brittle products should be useful embedding media for condenser plates as well as molding compounds. Such products usually have an oxygen-silicon ratio of 1.5 or greater and may be thermoset in situ by heat.

I claim:

1. An organo-polysiloxane comprising structural units which correspond to the empirical formulae $SiO_2$ and $RR'SiO$, respectively, where R and R' are monovalent hydrocarbon radicals attached to silicon through carbon-silicon linkages, said units being joined together through silicon-oxygen linkages and the silicon atoms of said units being the only silicon atoms in said siloxane.

2. An organo-polysiloxane comprising structural units which correspond to the empirical formulae $SiO_2$ and $RR'SiO$, respectively, where R and R' are alkyl radicals, said units being joined together through silicon-oxygen linkages and the silicon atoms of said units being the only silicon atoms in said siloxane.

3. An organo-polysiloxane comprising structural units which correspond to the empirical formulae $SiO_2$ and $(C_6H_5)_2SiO$, respectively, said units being joined together through silicon-oxygen linkages and the silicon atoms of said units being the only silicon atoms in said siloxane.

4. An organo-polysiloxane comprising structural units which correspond to the empirical formulae $SiO_2$ and $(C_6H_5)(C_2H_5)SiO$, respectively, said units being joined together through silicon-oxygen linkages and the silicon atoms of said units being the only silicon atoms in said siloxane.

5. An organo-polysiloxane comprising structural units which correspond to the empirical formulae $SiO_2$ and $RR'SiO$, respectively, where R and R' are aryl radicals attached to silicon through carbon-silicon linkages, said units being joined together through silicon-oxygen linkages and the silicon atoms of said units being the only silicon atoms in said siloxane.

6. An organo-polysiloxane comprising structural units which correspond to the empirical formulae $SiO_2$ and $RR'SiO$, respectively, where R is a lower alkyl radical and R' is a phenyl radical, said units being joined together through silicon-oxygen linkages and the silicon atoms of said units being the only silicon atoms in said siloxane.

7. An organo-polysiloxane comprising structural units which correspond to the empirical formulae $SiO_2$ and $(CH_3)_2SiO$, respectively, said units being joined together through silicon-oxygen linkages, the silicon atoms of said units being the only silicon atoms in said siloxane.

JAMES FRANKLIN HYDE.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,258,222 | Rochow | Oct. 7, 1941 |
| 2,371,050 | Hyde | Mar. 6, 1945 |

FOREIGN PATENTS

| Number | Country | Date |
|---|---|---|
| 113,708 | Australia | Sept. 4, 1941 |

OTHER REFERENCES

Dilthey, Berichte Deut. Chem. Gesel., vol. 37, 1904, pages 1139 to 1142.

Kipping, Tr. J. Chem. Soc. (London), vol. 101, 1912, pages 2108, 2113, and 2114.

Meads, Trans. Journal of the Chemical Soc. (London), vol. 105, 1914, pp. 679 to 682.

Rochow, Chemistry of the Silicones, Wiley 1946, pages 93 and 94.